Dec. 11, 1951    G. W. CRONK    2,578,000
WATER TANK FOR CONCRETE MIXERS
Filed July 19, 1946    3 Sheets-Sheet 1

GEORGE W. CRONK
Inventor

Dec. 11, 1951  G. W. CRONK  2,578,000
WATER TANK FOR CONCRETE MIXERS
Filed July 19, 1946  3 Sheets-Sheet 2
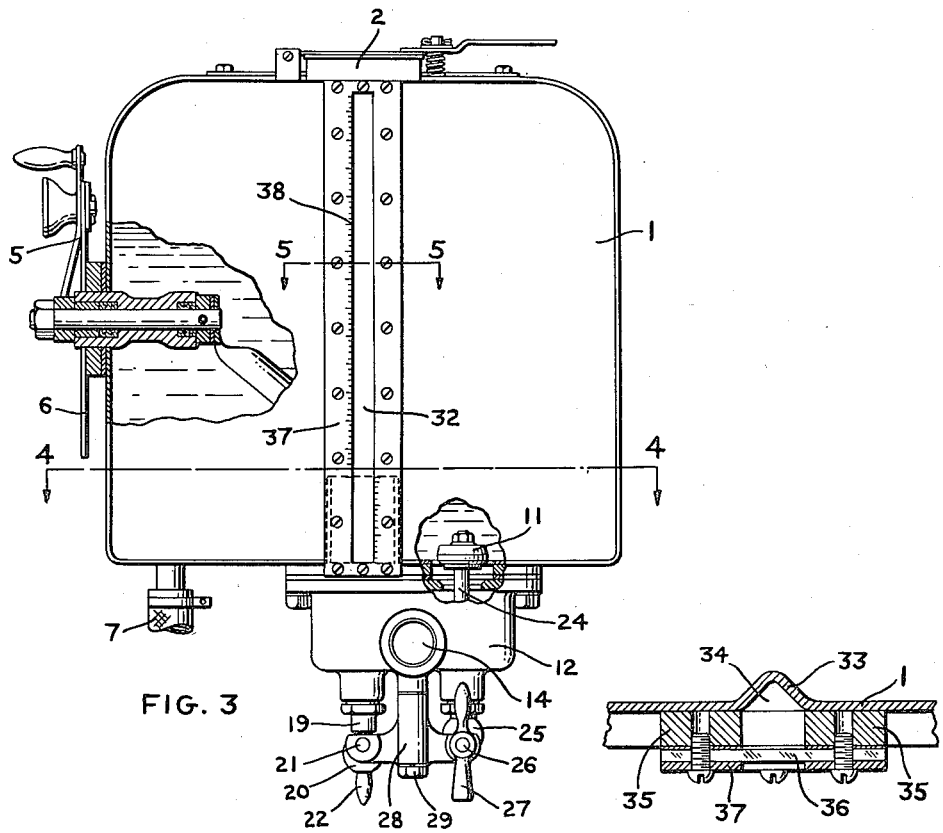
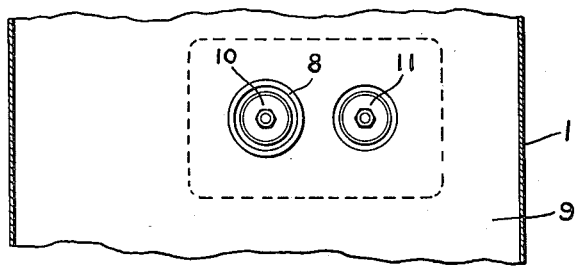
GEORGE W. CRONK
Inventor

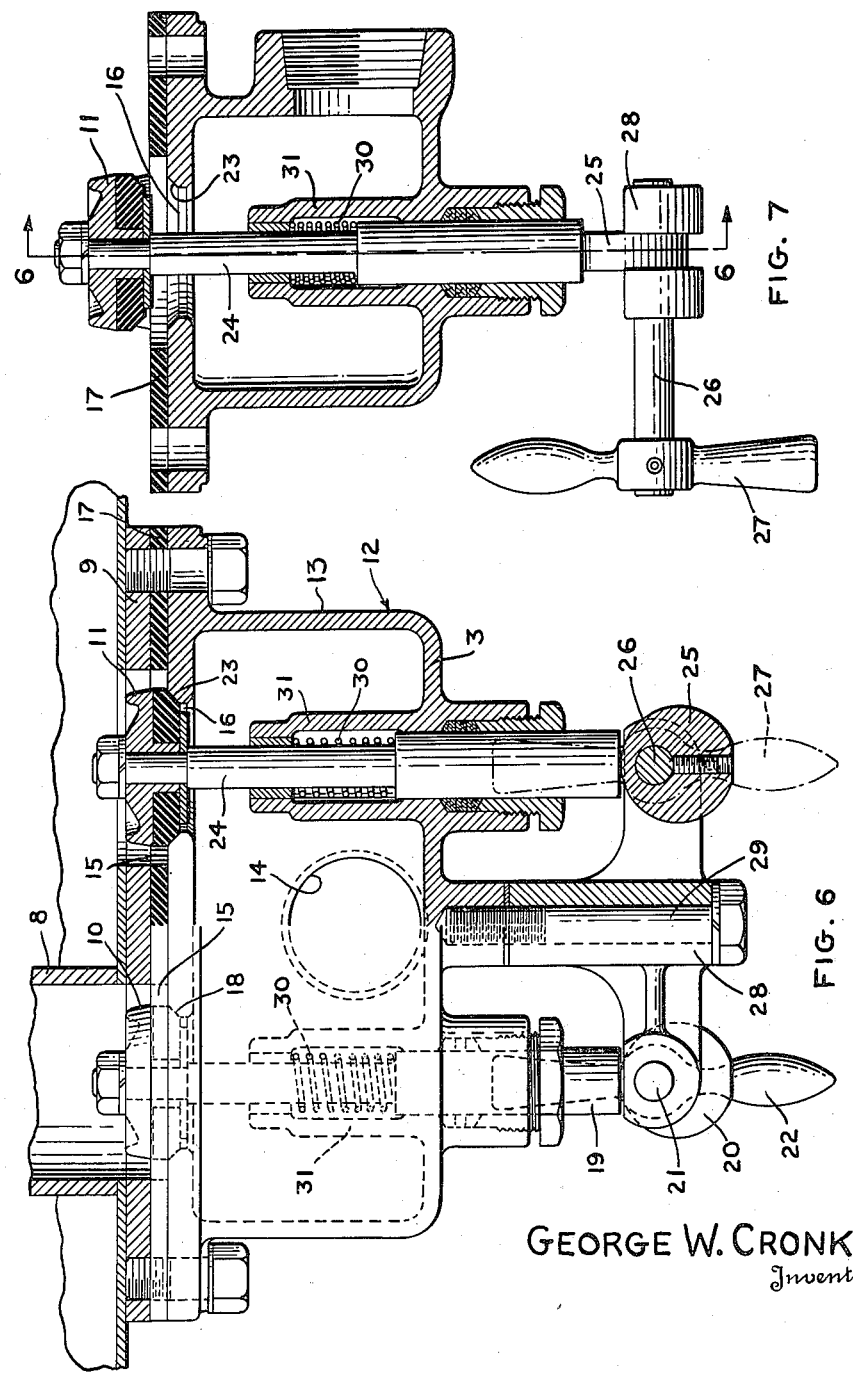

Patented Dec. 11, 1951

2,578,000

UNITED STATES PATENT OFFICE 2,578,000

WATER TANK FOR CONCRETE MIXERS

George W. Cronk, East Orange, N. J., assignor to Worthington Pump and Machinery Corporation, Harrison, N. J., a corporation of Delaware Application July 19, 1946, Serial No. 684,743

1 Claim. (Cl. 222—464)

This invention relates to concrete mixers, and more particularly to a water tank for use in connection with such mixers.

An object of the present invention is to provide a relatively simple and inexpensive water tank structure for portable concrete mixers which embodies a novel type of means whereby the quantity of water in the tank may be easily regulated to a definite predetermined quantity so as always to have the exact amount of water available for the particular mix of the batch of concrete to be mixed, and to retain in the tank a definite predetermined quantity of water for flushing out the mixer for cleaning after the concrete mix has been discharged so as to prevent "set-up" of concrete residue in the drum and provide a clean drum for the next batch.

Another object of the invention is to provide a water tank structure for concrete mixers, which is so constructed and designed that tilting of the mixer will not affect the quantity of water discharged from the tank.

The present invention is similar to and constitutes an improvement over the application Serial Number 587,528 filed by Henry Von Saspe, now Patent No. 2,526,520, issued October 17, 1950.

With these and other objects in view, as may appear from the accompanying specification, the invention consists of various features of construction of and combination of parts, which will be first described in connection with the accompanying drawings, showing a water tank for concrete mixers of a preferred form embodying the invention, and the features forming the invention will be specifically pointed out in the claim.

In the drawings:

Figure 3 is an end view of the tank with parts broken away and some parts shown in section.

Figure 4 is a detail horizontal section taken on line 4—4 of Figure 3.

Figure 5 is a detail section taken on the line 5—5 of Figure 3 and showing a cross section through the sight glass assembly.

Figure 6 is a view partly in side elevation and partly in section through the valve structure which controls the discharge of water from the tank.

Figure 7 is a vertical section through the valve structure, and taken at right angles to the section shown in Figure 6.

Figure 2:
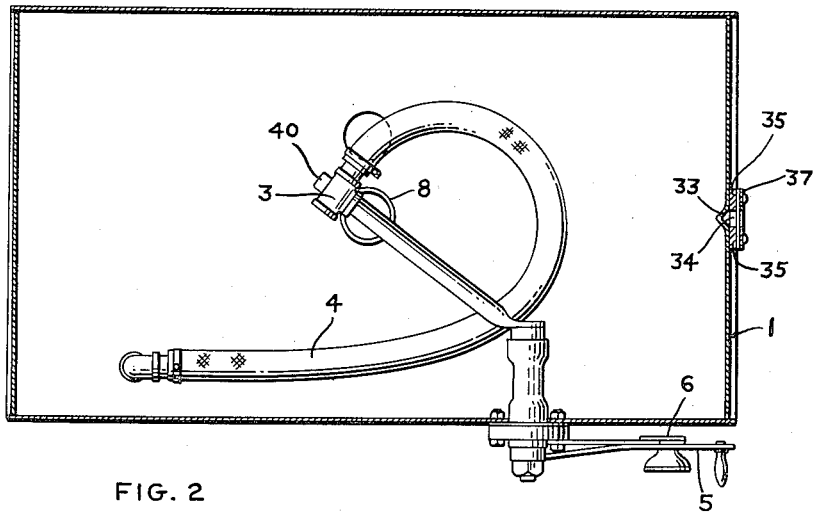
Figure 2 is a horizontal section through the tank taken on the line 2—2 of Figure 1.
Figure 1:
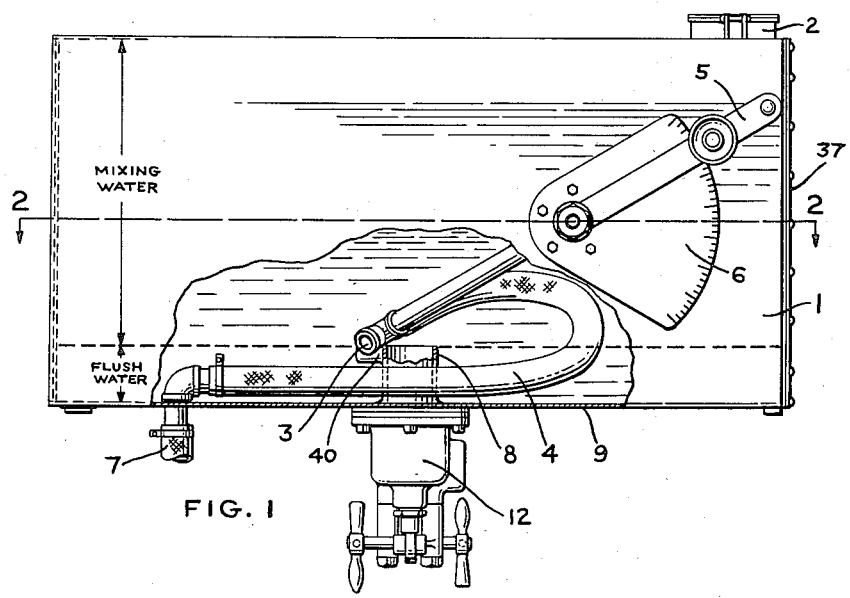
Figure 1 is a side elevation partly in section of the improved water tank for concrete mixers.

Referring more particularly to the drawings the improved water tank for concrete mixers includes a tank or receptacle 1, which is associated in the usual manner with a concrete mixing drum (not shown) and which receives a charge of water through the inlet 2.

The exact desired quantity of water required for any particular, or for each individual concrete mix or batch, plus a predetermined quantity of flush or cleaning water is provided regardless of the quantity of water in excess of the desired amount, in the tank 1 by the adjustment of the inlet end 3 of the flexible adjustable overflow member 4. The position of the inlet end 3 of the overflow member 4 is regulated by movement of the operating lever 5. The operating lever 5 co-operates with a graduated quadrant 6 to permit accurate regulation of the quantity of water in the tank 1 at each filling. To regulate the quantity of water in tank 1, the lever 5 is set at the desired quantity indicating setting on the quadrant 6, which moves the inlet end of the overflow hose or flexible member 4 at the required level in the tank 1, and any excess quantity of water delivered to the tank will flow through the overflow member 4 and out to waste, through the outlet 7.

The quantity regulating means just above referred to is illustrated, specifically described and claimed in the application of Henry Von Saspe, filed April 10, 1945, Serial Number 587,528, now Patent No. 2,526,520, and will not be specifically described or claimed herein.

In the Von Saspe structure a partition is placed in the tank to provide a quantity of flushing or cleaning water, together with other features cooperating therewith, whereas in the present invention such a partition is eliminated together with the separate compartment formed thereby as well as other features which co-operate with the structure shown, thus simplifying and reducing the cost of manufacture of the device, while retaining all of its advantages.

In the present invention a stand pipe 8 rises from the center of the bottom 9 of the tank 1 to a predetermined height so as to cause the retention within the tank 1 of a predetermined quantity of water after the water for the particular batch of concrete being mixed has been withdrawn.

The discharge of water from the tank 1 is controlled by valves 10 and 11 carried by the valve structure 12.

The valve structure 12 comprises a valve housing 13 having an outlet 14 which delivers water from the tank 1 into a concrete mixing drum (not shown) and also having inlet openings 15 and 16 in its top. The housing 13 is bolted or otherwise secured to the bottom 9 of the tank, on the outside of the tank and with a fluid tight seal 17 between the housing and tank bottom.

The valve 10 controls the flow of water through the opening 15, by co-operation with its valve seat 18 formed on the top of the housing 12, and since the opening 15 communicates with the interior of the tank 1 through the stand pipe 8, only that quantity of water above the upper open end of the stand pipe 8 can be discharged through the opening 15 past the valve 10.

The valve 10 is carried by a valve stem 19 which projects out of the housing 12 and has its outer end engaging the perimeter of a cam 20. The cam 20 is carried by and rotates with a shaft 21 to which an operating handle 22 is attached.

The valve 11, which controls the discharge from the tank 1 of the flushing or cleaning water; i. e. the water below the upper open end of the stand pipe 8, co-operates with a valve seat 23 and is carried by a valve stem 24. The valve stem 24 extends through and projects out of the housing 12, and has its outer end in engagement with the perimeter of a cam 25.

Like the cam 20, the cam 25 is carried by a shaft 26 which has an operating handle 27 thereon for manually operating the valve. The shafts 21 and 26 are carried by a suitable supporting structure 28 which is attached to the housing 12 in any suitable manner such as by the bolt 29.

The valves 10 and 11 are urged upon their seats 18 and 23 respectively, and the ends of the valve stems 19 and 24 are urged into engagement with the cams 20 and 25 respectively by springs 30, housed in suitable sleeves 31 formed within the housing 12.

With the particular construction of the tank of the present invention only one gage glass is required to provide visible indication of the quantity of water both for mixing and flushing purposes, and such a gage glass is shown at 32, and in cross section in Figure 5 of the drawings.

One end of the tank 1 is provided with an indent 33 extending the full height of the tank and providing a passage 34 which is open at its bottom to the interior of the tank 1 for receiving water. Strips 35 extend the full length of the passage 34 at each edge thereof and they have a glass plate 36 attached thereto, with suitable seals so that the quantity of water in the passage 34 can be easily seen. The cover plate 37 of the glass plate 36 is graduated as shown at 38 to correspond with the gallonage content of the tank 1, so that, by reading the height of the water in the passage 34 on the graduations 38 the quantity of water in the tank 1 can be readily determined.

By placing the openings 15 and 16 at the center of the bottom of the tank 1, the discharge of water from the tank will not be affected by tilting of the tank as may occur when the concrete mixer (not shown) equipped with the tank is standing on uneven ground.

If it is so desired a stop rest 40 for the overflow member 4 may be provided on the stand pipe 8.

In operation, with the valve structure 12 closed, the handle 5 is set on the scale 6 so that the desired quantity of mixing water will be contained in the tank 1 between the top of the standpipe 8 and the overflow inlet 3. Water is admitted through inlet 2, the excess flowing to waste through the inlet 3, conduit 4, and outlet 7. When it is desired to add the mixing water to the concrete drum, the valve handle 22 is rotated so that the cam 20 forces the valve 10 off its valve seat 18 and the measured water above the standpipe 8 flows into the housing 13 and thence outward through outlet 14 to the drum. After the drum contents have been discharged and it is desired to flush the drum out, the handle 27 is turned so that the cam 25 lifts the valve 11 off its seat 23. The water in the bottom of the tank 1 below the top of the standpipe 8 then flows into the housing 13 and thence to the drum through outlet 14. The handles 22 and 27 are then returned to the positions illustrated in Figure 6 and the valves 10 and 11 are seated so that the tank 1 may be refilled and the cycle of operation repeated. It will be seen that with the described construction the usual flush water compartment is eliminated.

It will be understood that the invention is not to be limited to the specific construction or arrangement of parts shown, but that they may be widely modified within the invention defined by the claim.

What is claimed is:

In a water tank structure for concrete mixers, a water tank for containing a quantity of both batch mixing water and flushing water, a valve housing attached to the bottom of said tank and having a pair of spaced valve seats in its upper surface, said tank provided with openings aligning with said valve seats, said valve housing having a water outlet, valves carried by said valve housing and seating upon said seats, means for moving said valves on to or off of their seats, an outlet standpipe for batch mixing water surrounding one of the openings in the bottom of said tank and extending upwardly a predetermined distance into the tank whereby a predetermined quantity of flushing water will be retained in the tank after the valve aligning with said standpipe is opened to permit the flow of batch mixing water from the tank.

GEORGE W. CRONK.

REFERENCES CITED

The following references are of record in the file of this patent:

UNITED STATES PATENTS

| Number | Name | Date |
|---|---|---|
| 245,528 | Marchand | Aug. 9, 1881 |
| 373,537 | Smith | Nov. 22, 1887 |
| 1,383,708 | Farr | July 5, 1921 |
| 1,495,532 | Rix | May 27, 1924 |
| 1,732,599 | Hardesty | Oct. 22, 1929 |
| 1,795,431 | Kirkpatrick | Mar. 10, 1931 |
| 1,930,618 | Jones | Oct. 17, 1933 |
| 2,316,132 | Jaeger | Apr. 6, 1943 |
| 2,374,970 | Ball | May 1, 1945 |
| 2,428,729 | West | Oct. 7, 1947 |